US009459124B2

(12) United States Patent
Khalfin et al.

(10) Patent No.: US 9,459,124 B2
(45) Date of Patent: Oct. 4, 2016

(54) ELECTROMAGNETIC TRACKER (AC) WITH EXTENDED RANGE AND DISTORTION COMPENSATION CAPABILITIES EMPLOYING MULTIPLE TRANSMITTERS

(71) Applicant: Sixense Entertainment, Inc., Los Gatos, CA (US)

(72) Inventors: Igor Khalfin, Pleasanton, CA (US); Amir Rubin, Los Gatos, CA (US)

(73) Assignee: Sixense Entertainment, Inc., Los Gatos, CA (US)

( * ) Notice: Subject to any disclaimer, the term of this patent is extended or adjusted under 35 U.S.C. 154(b) by 877 days.

(21) Appl. No.: 13/796,210

(22) Filed: Mar. 12, 2013

(65) Prior Publication Data

US 2013/0238270 A1    Sep. 12, 2013

Related U.S. Application Data

(60) Provisional application No. 61/609,516, filed on Mar. 12, 2012.

(51) Int. Cl.
| | | |
|---|---|---|
| *G01D 18/00* | (2006.01) | |
| *G06F 17/10* | (2006.01) | |
| *G05G 9/00* | (2006.01) | |
| *G01D 5/20* | (2006.01) | |

(52) U.S. Cl.
CPC ............... *G01D 18/00* (2013.01); *G05G 9/00* (2013.01); *G06F 17/10* (2013.01); *G01D 5/208* (2013.01)

(58) Field of Classification Search
CPC .... G01D 18/00; G01D 5/208; G01D 5/2208; G01D 5/225; G05G 9/00; G05G 2009/04755; G06F 17/10; G06F 17/147; G06F 17/16
See application file for complete search history.

(56) References Cited

U.S. PATENT DOCUMENTS

| | | | |
|---|---|---|---|
| 4,287,809 A | 9/1981 | Egli | |
| 4,314,251 A | 2/1982 | Raab | |
| 4,737,794 A | 4/1988 | Jones | |
| 5,307,072 A * | 4/1994 | Jones, Jr. | ........... F41G 3/08 324/244 |
| 5,752,513 A | 5/1998 | Acker | |
| 5,831,260 A | 11/1998 | Hansen | |
| 6,147,480 A | 11/2000 | Osadchy | |
| 6,148,280 A | 11/2000 | Kramer | |
| 6,369,564 B1 | 4/2002 | Khalfin | |
| 6,400,139 B1 | 6/2002 | Khalfin | |
| 6,539,327 B1 | 3/2003 | Dassot | |
| 6,624,626 B2 | 9/2003 | Khalfin | |
| 2003/0201767 A1* | 10/2003 | Khalfin | ........... G01S 1/024 324/207.17 |
| 2005/0246122 A1* | 11/2005 | Jones, Jr. | ........... G01B 7/004 702/107 |
| 2005/0285590 A1* | 12/2005 | Higgins | ........... G01B 7/004 324/207.17 |
| 2008/0120061 A1* | 5/2008 | Higgins | ........... G01B 7/004 702/150 |
| 2009/0030646 A1* | 1/2009 | Jones | ........... G01R 33/04 702/150 |

OTHER PUBLICATIONS

Henry Himberg, Latency and Distortion Compensation in Augmented Environments Using Electromagnetic Tracker, 2010, Ph.D. Dissertation, Department of Electrical and Computer Engineering, Virginia Commonwealth University, Richmond, VA, 142 pp.*
Pohlemus G4 User Manual, Rev. C, Oct. 2012.
* cited by examiner

*Primary Examiner* — Toan Le
(74) *Attorney, Agent, or Firm* — Gard & Kaslow LLP

(57) ABSTRACT

An alternating current (AC) electromagnetic tracker system with increased operational range and an ability to compensate for electromagnetic distortion in the local operating environment. The system uses multiple "N" sources/transmitters located at known positions in a common reference frame. A sensor receives the generated signal of each of the sources and a processor computes a position and orientation of the sensor from each. The processor further uses the known relative position and orientation between the N sources to compensate for distortion in the operating environment.

13 Claims, 3 Drawing Sheets

ELECTROMAGNETIC TRACKER (AC) WITH EXTENDED RANGE AND DISTORTION COMPENSATION CAPABILITIES EMPLOYING MULTIPLE TRANSMITTERS

CROSS-REFERENCE TO RELATED APPLICATIONS

This application claims the benefit of U.S. Provisional Patent Application No. 61/609,516 filed on Mar. 12, 2012 and entitled "Electromagnetic Tracker (AC) with Extended Range and Distortion Compensation Capabilities Employing Multiple Transmitters," which is incorporated herein by reference in its entirety.

BACKGROUND

1. Field of the Invention

The field of this invention is in the area of computer input devices, including video game controllers.

2. Related Art

As the market for and variety of video games has increased, so has the demand for video game controllers. Early controllers were typically joysticks or trackballs in a fixed mount thus requiring the user or game player to remain fairly stationary while playing the video game. Seeking to give the game player more freedom of movement as well as a greater range of video game input control, still later controllers were handheld and incorporated accelerometers to determine controller movement. Other, external detectors have also been used to detect controller movement. Such external detectors include ultrasound and optical mechanisms that attempt to track movement of a controller in a field of view.

A more advanced form of controller known in the art utilizes magnetic fields. Coils located in a sensor detect the presence of the magnetic field to determine position and orientation of the sensor. Although very precise, such magnetic field trackers typically require close proximity with the transmitter/source of the magnetic field.

One form of such trackers, Alternating Current (AC) electromagnetic trackers, offer advantages for working in a limited physical space or operational volume and are useful for a variety of applications including military (line-of-sight tracking), medical, motion capture, gaming/entertainment, etc. They have no drift in comparison with inertial trackers, are more accurate and sensitive in comparison with direct current (DC) magnetic trackers, and operate beyond line of sight as compared to optical trackers.

However, as is known in the art, one problem of AC electromagnetic trackers is their sensitivity to electromagnetic distortion caused by eddy currents induced by the magnetic field of the transmitter/source in conducting surfaces existing within the operating volume.

This problem can be better understood by first reviewing the well known in the art basic concept of the AC electromagnetic tracker, which is to find the induction vector, $B_k$, generated by the source/transmitter coil κ(usually there are 3 orthogonal source/transmitter coils, x, y, and z, as is known in the art) at the location of a tracker receiver or probe sensor, with radius vector r from the center of the source to the sensor:

$$B_k = \frac{IS_{source}\mu_0}{4\pi}\frac{1}{r^3}(3(e_k \cdot \rho)\rho - e_k) \quad (1)$$

where I is the source/transmitter coil's current, $S_{source}$ is an effective area of the source/transmitter coil r=|r|, ρ is the unit vector in the direction of r, $e_k$ is the unit vector along the axis of $k^{th}$ coil, and $\mu_0$ is the magnetic permeability. Then derived is the transfer function, $\mathfrak{T}$, between the source/transmitter coil's currents and the sensor's voltages that has explicit dependence on their relative position and orientation. Assuming that there are three orthogonal coils per source/transmitter with the same effective area, $S_{source}$, and three orthogonal sensor coils with the same effective area, $S_{sensor}$, the electric signal (voltage) in the tracker sensor can be described as:

$$V = \frac{S_{sensor}S_{source}\mu_0}{4\pi}\frac{\omega}{r^3}\mathfrak{T} \cdot \mathfrak{J}, \quad (2)$$

where $\mathfrak{T} = \mathbb{T}(\psi, \theta, \varphi)_{source \to sensor} \cdot \mathbb{R}$ Here V is a 3×3 signal matrix scaled to tracker pre-amp and analog-to-digital-converter (ADC) gains, which is a 3×3 diagonal (ideally) matrix, $\mathfrak{T}$ is the normalized transfer function that describes the relative position and orientation, actually, the product of the directional cosine matrix, $\mathbb{T}$ ($\psi, \theta, \phi)_{source \to sensor}$, with the position matrix, $\mathbb{R}$, that is a 3×3 matrix, each column of which is a vector from the right hand side of the Eq. 1 (in the parenthesis) corresponding to each coil of the source/transmitter, and $\mathfrak{J}$ is the source's currents matrix, which ideally is diagonal.

As should now be clear to one of skill in the art, the formulas above (Eq. 1 and 2) explain the challenges of maintaining/increasing the operating range of AC electromagnetic trackers while avoiding electromagnetic distortion effects:

Increase of frequency, ω, increases the distortion as $\omega^2$

Increase of current, I, or effective areas, S, increases the distortion linearly.

As is also understood, typical configurations of AC magnetic trackers are known in the art as described in U.S. Pat. Nos. 4,737,794, 4,287,809, 4,314,251, and references therein. However, these trackers have no effective mechanism for the distortion compensation and their performance is limited by the factors described above.

Another known prior approach is described in U.S. Pat. No. 6,539,327 which offers the use of a gradient field for reliable tracking but due to exactly this factor has significantly limited spatial performance in comparison with "conventional" AC trackers.

Several authors proposed combinations of electromagnetic and optical trackers, electromagnetic and inertial trackers, or all of the above. See, for example, U.S. Pat. Nos. 5,831,260 and 6,148,280 and references therein. However, these trackers become more complex from the point of view of hardware and firmware and, while providing additional reference, still have the limitations described earlier. For example, combination electromagnetic/optical trackers will not compensate for the distortion or extend an operational range if optical line of sight is obstructed.

Some patents discuss AC electromagnetic trackers with multiple sources/transmitters. U.S. Pat. No. 6,147,480 discusses a tracker with several transmitters but signal processing requires prior knowledge of the operating environment without the distortion, then, when the source of distortion is introduced, results are compared with a baseline. U.S. Pat. No. 5,752,513 describes a tracker with multiple co-planar transmitter coils where the sensor operates just above the transmitter plane thus confining the operational volume. US Patent publication US2008/0120061 A1 describes a system with multiple wireless miniature transmitters and a stationary sensor. In that system the transmitters are used as probes. Yet this system has no provision for real time distortion compensation and has limited range.

Another system, available from Polhemus and named G⁴(™), has an ability to work with multiple transmitters/sources; the transmitters are treated one at a time, so the system has no ability to utilize multiple source data for distortion compensation.

Another system is described in U.S. Pat. No. 6,369,564 which has stationary transmitter and sensors and uses a wireless tuned LC circuit as a probe that has a known distortion pattern at a given signal phase. The system has an operational volume restricted by the position of the stationary sensors. One more system is described in U.S. Pat. No. 6,400,139 which has a transmitter, a probe sensor, and an array of stationary "witness" sensors at known fixed positions. Errors in the position and orientation solution for "witness" sensors are used to estimate distortion effects in the probe sensor. As before, this system has the operational volume restricted by the position of the stationary sensors. Further, a system is described in U.S. Pat. No. 6,624,626 which has a single transmitter that emits a modulated, e.g., frequency modulated (FM), signal, and components of this signal are used to compensate for the distortion but the system has an operational range defined by the transmitter effective area and its drive current.

What is needed is an AC electromagnetic tracker with extended operational range and electromagnetic distortion compensation capabilities without the complexity and additional componentry or complexity of the known approaches.

SUMMARY

An exemplary apparatus for determining a position and orientation of an object with respect to a common reference frame in the presence of an electromagnetic distortion comprises: two or more transmitters each one of the two or more transmitters configured to be a source of an alternating current (AC) electromagnetic field; a sensor attached to the object and configured to measure components of an induction vector from each one of the two or more transmitters to the sensor by sensing the AC electromagnetic field of each one of the two or more transmitters; and a signal processor configured to: calculate a transfer function between each one of the two or more transmitters and the sensor; receive from the sensor the measured components of the induction vectors; and determine the position and orientation of the object using the measured components of the induction vectors and the calculated transfer function.

An exemplary method for determining a position and orientation of an object with respect to a common reference frame in the presence of an electromagnetic distortion comprises: generating an alternating current (AC) electromagnetic field from each of multiple transmitters; measuring induction vector components from each of the multiple transmitters to a sensor locating on the object by sensing, using the sensor, the generated AC electromagnetic field from each of the multiple transmitters; computing by a signal processor a transfer function between each of the multiple transmitters and the sensor located on the object; computing by the signal processor the position and orientation of the object for each of the multiple transmitters in the common reference frame using the measured induction vector components and the computed transfer function.

A further exemplary method further comprises performing distortion compensation by the signal processor: computing by the signal processor a position and orientation of the sensor with respect to each of the multiple transmitters; calculating differences between the computed positions and orientations of the sensor with respect to known locations of the multiple transmitters; estimating electromagnetic distortion effects based on the calculated differences; and wherein computing by the signal processor the position and orientation of the object for each of the multiple transmitters in the common reference frame using the measured induction vector components and the computed transfer function comprises the signal processor providing a common position and orientation solution for the sensor located on the object in the common reference frame with the estimated electromagnetic distortion effects removed.

DETAILED DESCRIPTION

Described herein is an AC electromagnetic tracker system with increased operational range and an ability to compensate for electromagnetic distortion in the local operating environment. The system uses multiple "N" sources/transmitters, each of which contains 3 non-coplanar coils for generating a magnetic field. As is understood by one of skill in the art, N sources are equivalent to increasing an effective area of a single transmitter N times, i.e., term $S_{source}$ in the above equations (1 and 2) is replaced by $N*S_{source}$, thereby increasing operational range.

In one embodiment, the relative position and orientation of the N sources are known and constant at a time in a common reference frame.

The tracker sensor in the local operating environment receives the generated signal of each of the N sources and, using known processing components and physical configurations such as amplifiers, analog-to-digital converters (ADCs), processor elements and wired or wireless communications there between, computes a position and orientation from each.

Figure 1:
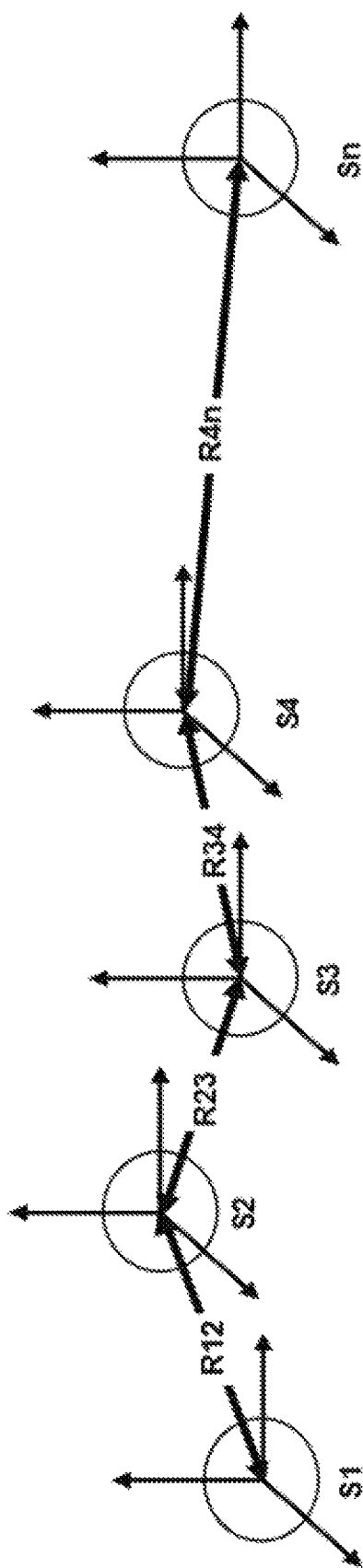
FIG. 1 is a diagram showing multiple transmitters/sources and their relative positions.

In one embodiment, a processor of the system uses the known relative position and orientation between the N sources to compensate for the electromagnetic distortion in the operating environment. For example, referring now to FIG. 1, the difference between the reported position from S1 and S2 is $R_{12}$ as follows:

Let $\alpha_{Sn}$ be a vector in the reference frame Sn and $R_{1n}$ is a vector from the origin of S1 to the origin of Sn. Then, for translation:

$$\alpha_{S1} = R_{1n} + \alpha_{Sn}, \quad (3a)$$

where $\alpha_{S1}$ is a vector in the reference frame S1. And for rotation, $b_{sn}$ is a unit vector in the reference frame Sn and $T_{1n}$ is a rotation transformation (directional cosine matrix, DCM) rotating reference frame basis from Sn to S1, then the same vector in the reference frame S1 will be:

$$b_{s1} = \mathbb{T}_{1n} b_{sn} \quad (3b)$$

The differences between relationships of equations 3 for the combination of the sources/transmitters and actual solutions for them provide the direct measurements of the distortion error:

$$\alpha_{s1}(\text{actual}) = R_{1n} + \alpha_{Sn} + R(\text{dist})_{1n} \quad (4a)$$

$$b_{s1}(\text{actual}) = \mathbb{T}(\text{dist})_{1n} \mathbb{T}_{1n} b_{sn} \quad (4b)$$

Equations 4 derived for each of the non-repeating combinations of transmitters provide the system of equations to solve for $R(\text{dist})$ and $\mathbb{T}(\text{dist})_{1n}$. This system can be solved, for example, by the least squares method.

In one embodiment, besides being a tool for the distortion compensation the present system allows multiple transmitters to be embedded in existing equipment in the operating volume, for example in a display or television (TV) bezel or embedded in a speaker sound bar.

In one embodiment, each coil of each source/transmitter is driven at its own frequency simultaneously with frequencies orthogonal in the sampling Discrete Fourier Transform (DFT) space. While this makes the source driver end more complex, it puts no restrictions on the update rate and makes distortion compensation simpler.

Figure 2:
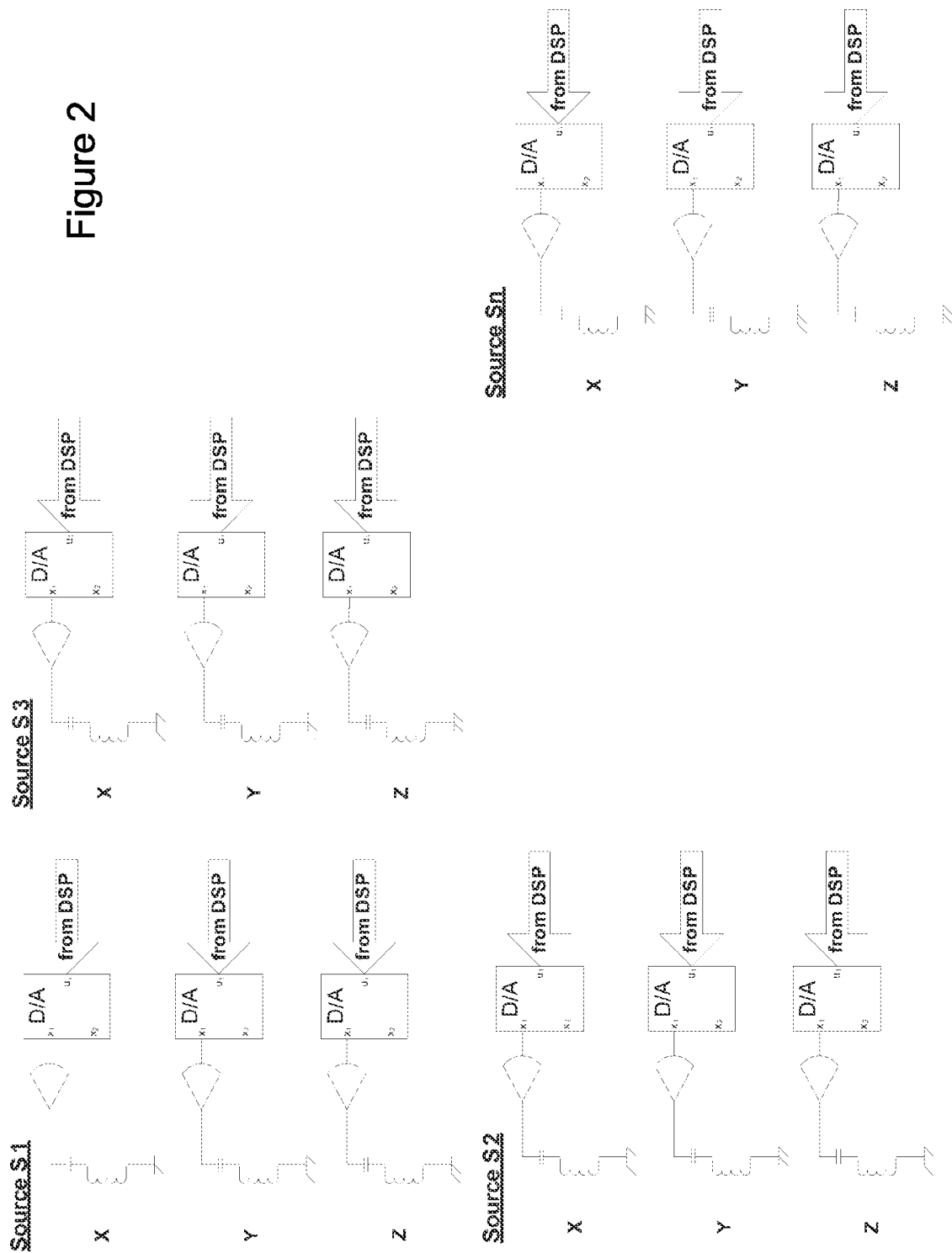
FIG. 2 is a block diagram of one embodiment of the present system.

Referring now to FIG. 2, one system embodiment can be seen. A digital signal processor (DSP) (not shown) generates the separate frequencies for each coil of each source transmitter continuously, which are converted by digital-to-analog converters (D/A) each per coil.

An alternative approach is to energize each source/transmitter coil at a time (time multiplexing). This simplifies schematics but makes the system slower and narrows ability for the distortion compensation.

A still further alternative is a combination of the above options, e.g., 3 frequencies for X-, Y-, and Z-source/transmitter coils, each energized simultaneously but being time multiplexed.

Figure 3:
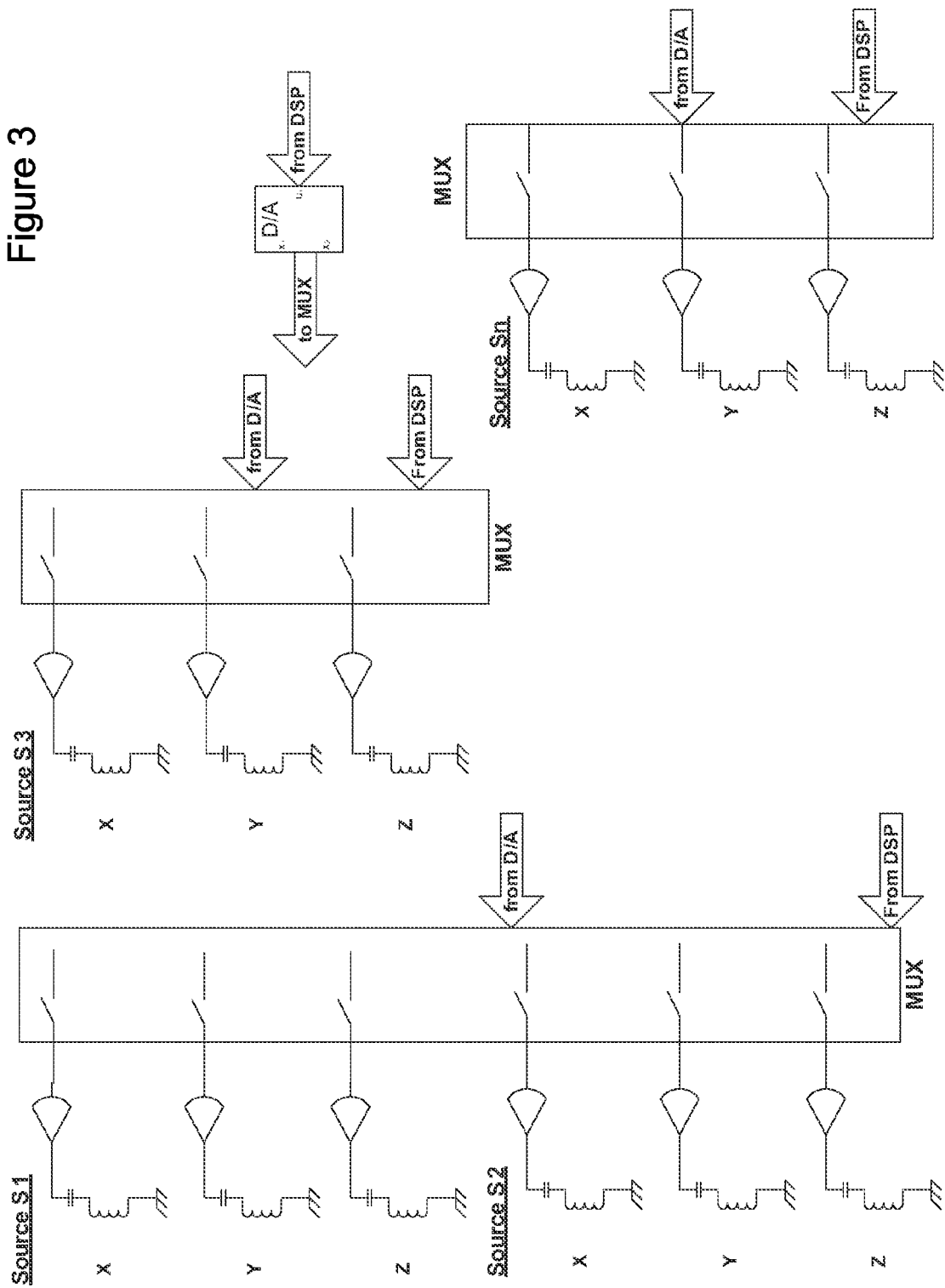
FIG. 3 is a block diagram of another embodiment of the present system.

Referring now to FIG. 3, an alternative system embodiment can be seen. The digital signal processor (DSP) (not shown) generates the same frequency for all source/transmitter coils; the coils are switched one at a time by a multiplexer (MUX) controlled by the DSP.

It is to be understood that various alternative embodiments and sequences of operation are to be included in the scope of the present invention.

For example, in one embodiment is an apparatus for determining the position and orientation of an object with respect to the known reference frame in the presence of an electromagnetic distortion comprising: more than one transmitter/source of AC electromagnetic field; at least one sensor measuring components of the induction vector and attached to an object of interest; and a signal processor that calculates the transfer function between the transmitters and the sensor and provides the position and orientation solutions of the sensor.

In a further embodiment, the sensor of the apparatus is wired to a common signal processing unit. In a still further embodiment, the sensor is wireless and provides a radiofrequency (RF) or optical link to the common signal processing unit.

In a further embodiment, each coil of each transmitter/source is energized continuously each having its own frequency.

In a further embodiment, each coil of each transmitter/source is energized one at a time at the same frequency.

In a further embodiment, the relative positions and orientations of the transmitter are constant at a time and known.

In a further embodiment, the transmitters are embedded in the bezel of a display or TV set.

In a further embodiment, the transmitters are embedded in a sound bar or other stationary sound system.

In a further embodiment, the transmitters are placed at known and unchanged known places.

As a further example, in one embodiment is a method of determining the position and orientation of a object utilizing an AC electromagnetic tracker in the presence of distortion comprising: generating an AC electromagnetic field from each of multiple transmitters/sources; measuring induction vector components from each of the transmitters/sources; computing a transfer function between each of the transmitters/sources and at least one sensor placed on the object of interest; and computing a position and orientation of the sensor for each of the transmitters/sources in the common reference frame.

In a further embodiment of the method distortion compensation comprises: measuring the position and orientation of the sensor with respect to each of the transmitters/sources; calculating differences of the position and orientation solutions with respect to known placement of the transmitters/sources; utilizing the calculated differences to estimate electromagnetic distortion effects; and providing a common position and orientation solution for the sensor in the common reference frame with the distortion effects removed.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, the description and the drawing should not be considered in a limiting sense, as it is understood that the present invention is in no way limited to only the embodiments illustrated.

What is claimed is:

1. An apparatus for determining a position and orientation of an object with respect to a common reference frame in the presence of an electromagnetic distortion comprising:
   two or more transmitters wherein each one of the two or more transmitters comprises three coils and is configured to be a source of an alternating current (AC) electromagnetic field;
   a sensor attached to the object and configured to measure components of an induction vector from each one of the two or more transmitters to the sensor by sensing the AC electromagnetic field of each one of the two or more transmitters;
   and
   a signal processor configured to:
      calculate a transfer function between each one of the two or more transmitters and the sensor;
      receive from the sensor the measured components of the induction vectors; and,
      determine the position and orientation of the object using the measured components of the induction vectors and the calculated transfer function.

2. The apparatus of claim 1 wherein the signal processor configured to receive from the sensor the measured components of the induction vectors is via a wired connection.

3. The apparatus of claim 1 wherein the signal processor configured to receive from the sensor the measured components of the induction vectors is via a wireless connection.

4. The apparatus of claim 1 wherein each of the two or more transmitters is configured to energize each of the three coils continuously and at a different frequency.

5. The apparatus of claim 1 wherein each of the two or more transmitters is configured to energize each of the three coils at a different point in time and at a same frequency.

6. The apparatus of claim 1 wherein a relative position and orientation of each of the two or more transmitters is constant and known to the signal processor.

7. The apparatus of claim 1 wherein the two or more transmitters are embedded in a bezel of a display or television set.

8. The apparatus of claim 1 wherein the two or more transmitters are embedded in a sound bar or other stationary sound system.

9. The apparatus of claim 1 wherein each of the two or more transmitters are located at a fixed, known position in the common reference frame.

10. A method for determining a position and orientation of an object with respect to a common reference frame in the presence of an electromagnetic distortion comprising:
    generating an alternating current (AC) electromagnetic field from each of multiple transmitters, wherein each one of the multiple transmitters comprises three coils;
    measuring induction vector components from each of the multiple transmitters to a sensor located on the object by sensing, using the sensor, the generated AC electromagnetic field from each of the multiple transmitters;
    computing by a signal processor a transfer function between each of the multiple transmitters and the sensor located on the object; and
    computing by the signal processor the position and orientation of the object for each of the multiple transmitters in the common reference frame using the measured induction vector components and the computed transfer function.

11. The method of claim 10 further comprising performing electromagnetic distortion compensation by the signal processor:
    computing by the signal processor a position and orientation of the sensor with respect to each of the multiple transmitters;
    calculating differences between the computed positions and orientations of the sensor with respect to known locations of each of the multiple transmitters;
    estimating electromagnetic distortion effects based on the calculated differences; and
    wherein computing by the signal processor the position and orientation of the object for each of the multiple transmitters in the common reference frame using the measured induction vector components and the computed transfer function comprises:
        the signal processor providing a common position and orientation solution for the sensor located on the object in the common reference frame with the estimated electromagnetic distortion effects removed.

12. The method of claim 10 wherein generating the AC electromagnetic field from each of the multiple transmitters comprises energizing each coil in the multiple transmitters continuously and at a different frequency.

13. The method of claim 10 wherein generating the AC electromagnetic field from each of the multiple transmitters comprises energizing each coil in the multiple transmitters at a different point in time and at a same frequency.

* * * * *